June 13, 1933.   H. G. BLOSSER   1,913,826
OSCILLATING MOTOR
Filed Oct. 9, 1929   2 Sheets-Sheet 2

INVENTOR:
H. G. Blosser,
by A. R. Vencill
His Attorney

Patented June 13, 1933

1,913,826

UNITED STATES PATENT OFFICE

HERMAN G. BLOSSER, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

OSCILLATING MOTOR

Application filed October 9, 1929. Serial No. 398,341.

My invention relates to oscillating motors, and particularly to oscillating motors comprising a contact and means for periodically operating said contact.

One object of my invention is to provide an oscillating motor which will intermittently open and close an electric circuit at a constant predetermined frequency, and which will operate on either unidirectional or alternating current.

I will describe two forms of oscillating motors embodying my invention, and will then point out the novel features thereof in claims.

Figure 1:
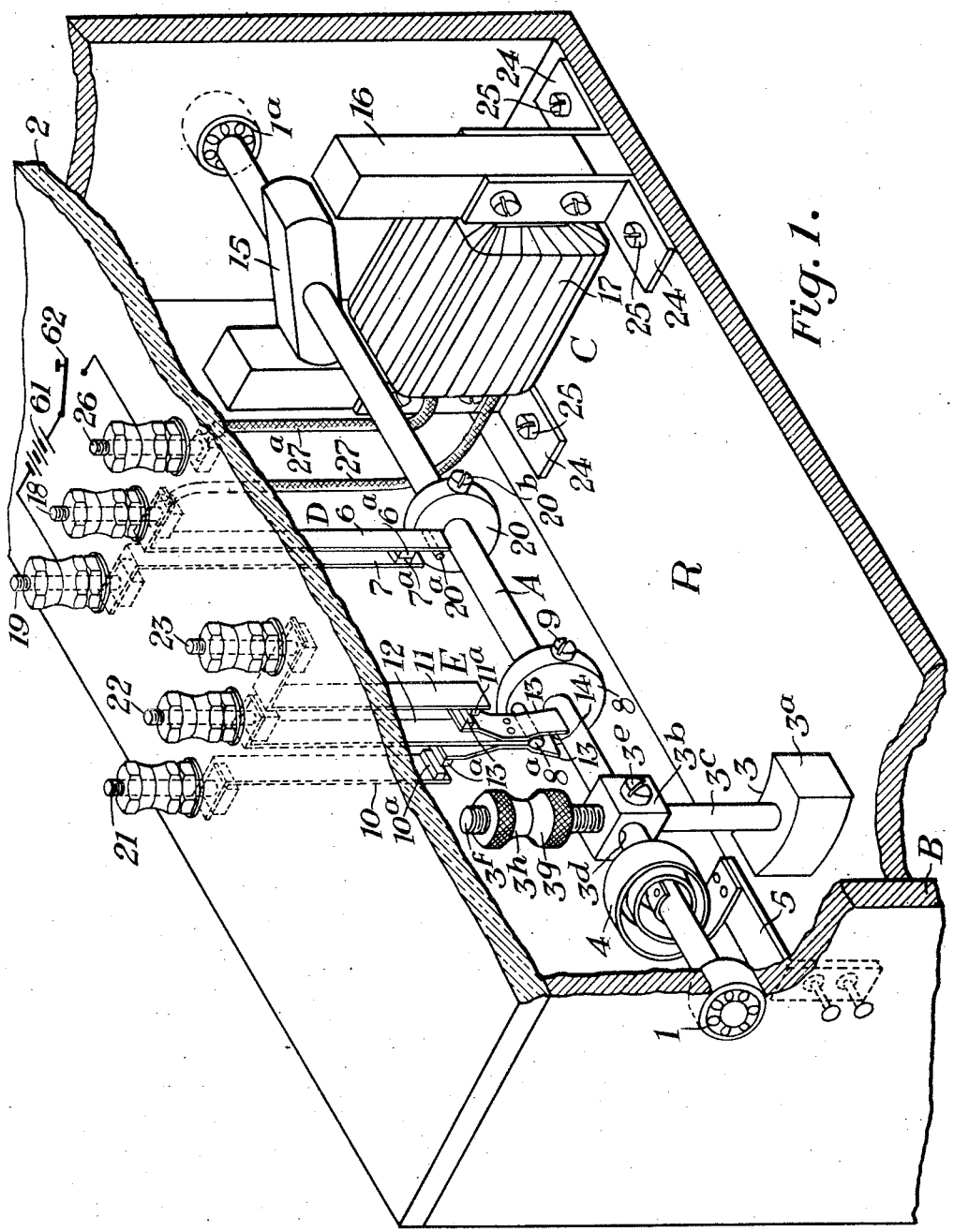
Figure 2:
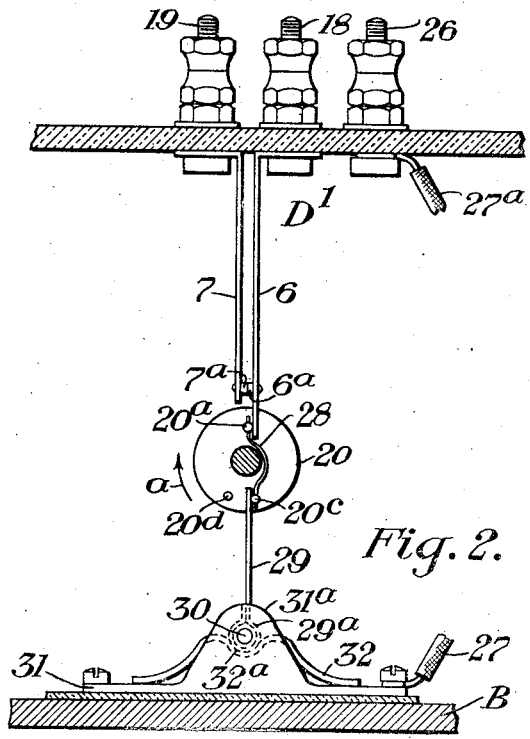

In the accompanying drawings, Fig. 1 is an isometric view, showing one form of an oscillating motor embodying my invention, certain of the parts being broken away to more clearly illustrate the construction. Fig. 2 is a view showing, in side elevation, a modified form of a portion of the oscillating motor shown in Fig. 1, and also embodying my invention.

Similar reference characters refer to similar parts in all three views.

Referring first to Fig. 1, the oscillating motor, designated in general by the reference character R, comprises, in the form here shown, a rockshaft A which is journaled at its ends in suitable bearings 1 and 1$^a$, ball bearings being preferred because of the low frictional resistance which they offer to oscillation of the shaft. The bearings 1 and 1$^a$ are mounted in the opposite ends of a housing B, provided with a top plate 2 of bakelite or other insulating material. The housing B and the top plate 2 completely enclose the operating parts of the oscillating motor and prevent dirt or other foreign material from coming into contact with these parts.

The rockshaft A is biased to one position by a pendulum 3 and by a spiral spring 4. The pendulum 3 may have any suitable form, but in the form here shown, comprises a pendulum bob 3$^a$ attached, by means of a metal rod 3$^c$, to a hub 3$^b$. The hub 3$^b$ is provided with an opening 3$^d$, extending horizontally therethrough, from one side to the other, which opening receives the rockshaft A. A set screw 3$^e$, screwed through the hub into engagement with the rockshaft, fastens the pendulum to the rockshaft. A threaded vertical post 3$^f$, supported by the hub 3$^b$, carries two counterweights 3$^g$ and 3$^h$, by means of which the period of the pendulum may be regulated within certain limits.

One end of the spring 4 is riveted to the rockshaft A, while the other end is riveted to a bracket 5 attached to the end of the housing B. The spring 4 is riveted to the rockshaft in such a position that, when the rockshaft occupies the position in which the pendulum 3 is vertical, the spring is under very little or no stress, but that, when the rockshaft is rotated from this position in either direction, the spring is flexed. It will thus be seen that the spring 4 aids the pendulum 3 in biasing the rockshaft to the position which the rockshaft occupies when the pendulum 3 is vertical, which position I shall term the "normal" position.

The rockshaft A may control any number of contact mechanisms, only two of which, D and E, are illustrated in Fig. 1. The contact mechanism D, in the form here shown, comprises two spaced parallel strips 6 and 7 of suitable electrical conducting material, such for example, as phosphor bronze. The strips 6 and 7 carry low resistance contact blocks 6$^a$ and 7$^a$ respectively, and are attached, respectively, to terminal posts 18 and 19 mounted on the top plate 2. The lower end of strip 6 is arranged to be at times engaged by a pin 20$^a$ projecting from the side of a cam 20 carried by the rockshaft A. The cam 20 is of insulating material, and is provided with a set screw 20$^b$ by means of which the cam may be rigidly fastened to the rockshaft in any desired position. It will be apparent from an inspection of the drawings that, when the rockshaft A occupies its normal position, the contact block 6$^a$ engages the contact block 7$^a$ to close contact 6$^a$—7$^a$; but that when the rockshaft is rotated in a clockwise direction through a predetermined distance from the normal position, the pin 20$^a$ engages the strip 6 and bends this strip away from the strip 7 so that contact 6$^a$—7$^a$ is then opened.

The contact mechanism E comprises three spaced parallel strips 10, 11 and 12, also of suitable electrical conducting material, such as phosphor bronze. The strips 10, 11 and 12 are attached respectively to terminal posts 21, 23, and 22 mounted on the top plate 2. The strip 12 is located between the strips 10 and 11, and has riveted to its opposite sides near its lower end, two conducting pieces 13. The upper ends of the pieces 13 are bent away from the strip 12 and each carries a low resistance contact block 13ª. The contact blocks 13ª coact with two similar contact blocks 10ª and 11ª, attached respectively to the strips 10 and 11. The lower ends of the pieces 13 are also bent outwardly to form a channel 14 which receives the end of a pin 8ª extending horizontally from the side of a cam 8. The cam 8 is similar to the cam 20, and is fastened to the rockshaft A by means of a set screw 9. With the contact mechanism E constructed in this manner it will be apparent that, when rockshaft A occupies its normal positions contacts 10ª—13ª and 11ª—13ª are open, when rockshaft A is rotated from the normal position through a predetermined distance in a clockwise direction, contact 11ª—13ª becomes closed; but that, when rockshaft A is rotated from the normal position through a predetermined distance in a counter-clockwise direction, contact 10ª—13ª becomes closed.

The oscillating motor also comprises a motor device for oscillating the shaft A. In the form here shown, this motor device consists of an electromagnet C having a U-shaped core 16 provided with a winding 17 having terminal leads 27 and 27ª. The electromagnet C is fastened to the base of the housing B by means of brackets 24 and screws 25, and controls an armature 15 rigidly fastened to the rockshaft A between the legs of the core 16. The angular disposition of the armature 15 with respect to the shaft A is such that, when the shaft occupies its normal position, the longer axis of the armature is inclined vertically at an acute angle with the magnetic field which is set up between the legs of core 16 of electromagnet C when electromagnet C is energized.

The supply of energy to winding 17 of electromagnet C is controlled by the contact mechanism D. To this end, lead 27 is connected with terminal post 18, and lead 27ª is connected with terminal post 26. A source of electromotive force, here shown as a battery 61, is connected with the terminal posts 19 and 26 through a switch 62. It will thus be apparent that if switch 62 is closed, winding 17 will be supplied with current when contact 6ª—7ª is closed, but that the supply of current to winding 17 will be interrupted when this contact is opened.

When rockshaft A is oscillated to and fro by the electromagnet C in the manner which will be explained in detail hereinafter, the shaft A tends to oscillate at the natural period of the pendulum 3. The rockshaft A, however, and the parts attached thereto have a certain amount of balanced mass which broadens the tuning of the system. It is desirable that the tuning of the system should be as sharp as possible, and in order to accomplish this result, I tune the balanced mass of the system to resonance at the natural period of the pendulum 3 by means of the spiral spring 4. As previously pointed out the spring 4 is under very little or no stress when pendulum 3 occupies its vertical position. It will be apparent, therefore, that when rockshaft A is rotated from its normal position in either direction, spring 4 becomes stressed and stores up the kinetic energy of the balanced mass, so that when the direction of rotation of the rockshaft reverses, this energy is returned to the shaft. I have found that with the parts arranged in this manner, the frequency of the oscillating system will remain constant over a wide variation in temperature and over wide variations in the voltage applied to the electromagnet C.

It should be pointed out that if the pendulum 3 were completely counterbalanced by means of nuts 3ʰ and 3ᵉ, so that there would be no unbalanced mass the system would still be substantially tuned to resonance by the spiral spring, and the system would still have a sharp resonant response at a particular frequency.

As shown in the drawings, switch 62 is open so that winding 17 of electromagnet C is de-energized. Rockshaft A therefore occupies its normal position, and spring 4 is under very little or no stress. Contact 6ª—7ª of contact mechanism D is closed, and contacts 10ª—13ª and 11ª—13ª are both open. I will now assume that switch 62 is closed. Since contact 6ª—7ª is closed, current from battery 61 is supplied to winding 17, and flux lines are therefore set up in the air gap between the legs of core 16. These flux lines thread the armature 15, and as will be readily understood, exert a force on the armature which rotates the armature, and hence the rockshaft A in a clockwise direction. The parts of contact mechanism D are arranged in such manner, that when rockshaft A has rotated in a clockwise direction to approximately the position at which armature 15 is parallel with the field between the legs of core 16, pin 20ª engages strip 6 and opens contact 6ª—7ª. Winding 17 then becomes de-energized, but the rockshaft A continues to rotate in a clockwise direction until the kinetic energy which the rotating parts have acquired is spent in deforming the spring 4. When this has been done, the energy stored in spring 4 and in pendulum 3 reverses rockshaft A, so that rockshaft A now rotates in a counter-clockwise direction.

During this counter-clockwise rotation, contact 6ª—7ª again becomes closed and winding 17 therefore again becomes energized. Due, however, to the inductance of winding 17, the field between the legs of core 16 builds up slowly, and since rockshaft A is now rotating in a counter-clockwise direction, by the time the field has built up to its normal value, armature 15 is inclined at such an angle with the field that the electromagnet has little retarding effect on the rockshaft A during this counter-clockwise rotation. When the rockshaft A reaches its extreme counter-clockwise position, the energy stored in spring 4 and in pendulum 3 causes the rockshaft to again rotate in a clockwise direction. Electromagnet C then again exerts a force on rockshaft A tending to accelerate the rockshaft. The parts are so arranged and so proportioned that the energy supplied to the rockshaft during this clockwise rotation is greater than that expended in overcoming friction and other losses during this clockwise rotation and the previous counter-clockwise rotation together with that expended in overcoming the opposing force of the magnetic pull on armature 15 during the previous counter-clockwise rotation, so that the rockshaft starts to oscillate at the period to which it is tuned by the pendulum 3 and the spiral spring 4. The rockshaft will then continue to oscillate at this period as long as switch 62 remains closed.

It should be pointed out that the oscillating motor R may be operated on either unidirectional or alternating current. When it is desired to operate the oscillating motor on alternating current, the core 16 and armature 15 may both be laminated.

It will be apparent that when rockshaft A is oscillating contacts 10ª—13ª and 11ª—13ª are alternately opened and closed at the frequency of oscillation of the rockshaft A. These contacts may be used to control any desired circuits.

Referring now to Fig. 2, I have here shown a modified form of contact mechanism D¹ in which the cam 20 is provided with two pins 20ᶜ and 20ᵈ in addition to the pin 20ª shown in Fig. 1. The pin 20ᶜ is electrically connected with the pin 20ª by means of a conductor 28. Co-operating with pins 20ᵈ and 20ᶜ is a conducting strip 29, the lower end 29ª of which is bent into a cylindrical shape around a pin 30. The pin 30 is carried by two spaced projections 31ª extending upwardly from a conducting block 31. The block 31 may be fastened to the housing B in any suitable manner, insulation being provided between the block and the housing to prevent electrical contact between the block and housing. A spring 32 engages the top of the block 30 with both ends and presses upwardly against the cylindrical end 29ª of the strip 29 with considerable force by means of a centrally curved portion 32ª so that the friction between the spring and the strip will hold the strip 29 in any position to which it may be moved until positively moved from that position. When this form of contact mechanism D¹ is used, the lead 27 from the winding 17, instead of being connected with the terminal post 18, is connected with the conducting block 31 in any suitable manner. The remaining parts of the contact mechanism D are the same as in Fig. 1, as will readily be apparent from inspection of the drawings.

The operation of the oscillating motor when the modified form of contact mechanism D¹ shown in Fig. 2 is used is as follows: When the pendulum 3 is at rest the parts of the contact mechanism D¹ occupy the positions in which they are shown in Fig. 2. If, now, switch 62 is closed, current flows from the battery 61 through terminal post 19, strip 7, contact 6ª—7ª, strip 6, pin 20ª, conductor 28, pin 20ᶜ, conducting strip 29, conducting block 31, lead 27, coil 17, lead 27ª, terminal post 26, and switch 62 back to the battery 61. A torque is therefore exerted on rockshaft A by armature 15, and the rockshaft is rotated in the direction indicated by the arrow a in Fig. 2. When the shaft has rotated in this direction through a predetermined distance, engagement of pin 20ª with strip 6 opens contact 6ª—7ª, thereby de-energizing winding 17 and withdrawing the force tending to rotate shaft A. After the momentum of the rotating parts has been spent, shaft A starts to rotate in the opposite direction from that indicated by the arrow a due to the action on the shaft of the pendulum 3 and the spring 4. Pin 20ᶜ then moves out of engagement with the strip 29, and the pin 20ᵈ subsequently engages the strip, so that the circuit for winding 17 of electromagnet C is now open at pin 20ᶜ. The pin 20ᶜ remains out of engagement with the strip as long as the counter-clockwise rotation of the rockshaft in the direction opposite to that indicated by the arrow a continues. It follows, therefore, that no energy is supplied to shaft A during the rotation of the shaft in the latter direction in spite of the fact that contact 6ª—7ª becomes closed as soon as the shaft has rotated to the position at which the contact opened. The strip 29, however, rotates on the pin 30 in response to the rotation of the rockshaft A, and as soon as the direction of rotation of the shaft reverses so that the shaft is again rotating in the direction indicated by the arrow a, the pin 20ᶜ moves into engagement with strip 29 to establish the circuit for winding 17. Since contact 6ª—7ª is now closed, a force is again applied to the shaft. It will thus be apparent that with the contact mechanism D¹ shown in Fig. 2, a force is applied to the shaft A only during the time when the force is effective to maintain the operation of the motor. It follows that with the contact mechanism D¹ shown in Fig. 2, a considerable saving of power results.

While I have shown only two forms of contact mechanisms for controlling the supply of current to winding 17 of electro-magnet C, it will be readily understood that any other form of contact mechanism which is operated in accordance with the position of rockshaft A, may equally well be employed.

It will thus be seen that I have provided an oscillating motor which will operate at a constant predetermined frequency.

An oscillating motor embodying my invention is particularly suitable for, although in no way limited to, use for periodically interrupting, or coding, at predetermined frequencies, the current which is at times supplied to the track rails in certain forms of railway traffic controlling systems. In systems of the type described, the coded current thus supplied to the rails controls train carried governing means, which are selectively responsive to these currents in any suitable manner.

Although I have herein shown and described only two forms of oscillating motors embodying my invention, it is understood that various changes and modifications may be made therein within the scope of the appended claims without departing from the spirit and scope of my invention.

Having thus described my invention, what I claim is:

1. An oscillatory motor comprising a rockshaft mounted to oscillate about a horizontal axis, a gravity pendulum attached to said rockshaft and biasing said rockshaft to one position, a contact responsive to the position of said rockshaft, an electromagnet controlled by said contact, an armature attached to said rockshaft and cooperating with said electromagnet for oscillating said rockshaft; said contact, said electromagnet and said armature being so designed that said rockshaft will be oscillated at the natural period of said pendulum; and a spring for tuning the balanced mass of the oscillating parts to resonance at the natural period of said pendulum, said spring being connected with said shaft in such manner that said shaft is biased by said spring to the same position to which it is biased by said pendulum, whereby if said spring breaks said motor may still be made to oscillate at substantially the natural period of said pendulum.

2. An oscillatory motor comprising a rockshaft mounted to oscillate about a horizontal axis, a gravity pendulum attached to said rockshaft to oscillate in a vertical plane in response to oscillation of said rockshaft and biasing said rockshaft to one position, a contact controlled by said rockshaft and arranged to become opened when and only when said rockshaft is rotated away from said one position more than a predetermined distance in one direction, electromagnetic means for oscillating said rockshaft controlled by said contact, said means being so designed that said rockshaft will be oscillated at the natural period of said pendulum, and a spiral spring for tuning the balanced mass of the oscillating parts to resonance at the natural period of said pendulum connected with said rockshaft in such manner that said rockshaft is biased by said spring to said one position, whereby in the event that said spring breaks said motor may still be made to oscillate at substantially the natural period of said pendulum.

In testimony whereof I affix my signature.

HERMAN G. BLOSSER.